United States Patent
Hiroshima

(10) Patent No.: US 7,739,940 B2
(45) Date of Patent: Jun. 22, 2010

(54) DIRECTIONAL CONTROL VALVE DEVICE AND FLUID PRESSURE CYLINDER DEVICE

(75) Inventor: Makoto Hiroshima, Osaka (JP)

(73) Assignee: Taiyo, Ltd., Osaka (JP)

( * ) Notice: Subject to any disclaimer, the term of this patent is extended or adjusted under 35 U.S.C. 154(b) by 344 days.

(21) Appl. No.: 11/892,246

(22) Filed: Aug. 21, 2007

(65) Prior Publication Data

US 2009/0001300 A1 Jan. 1, 2009

Related U.S. Application Data

(63) Continuation of application No. PCT/JP2006/303383, filed on Feb. 24, 2006.

(30) Foreign Application Priority Data

Mar. 10, 2005 (JP) .............................. 2005-067139

(51) Int. Cl.
 F15B 13/04 (2006.01)
 F16D 31/02 (2006.01)
 G05D 11/02 (2006.01)
(52) U.S. Cl. ............................. 91/32; 60/473; 137/112
(58) Field of Classification Search ................... 60/473, 60/476; 91/32, 519; 137/113, 112
 See application file for complete search history.

(56) References Cited

U.S. PATENT DOCUMENTS

| | | | | |
|---|---|---|---|---|
| 3,570,521 A | * | 3/1971 | Kirschenman | ............... 137/113 |
| 4,674,526 A | * | 6/1987 | Athanassiu | ................... 137/113 |
| 4,779,836 A | | 10/1988 | Marklund | |
| 4,833,971 A | * | 5/1989 | Kubik | ........................... 91/519 |
| 5,048,292 A | * | 9/1991 | Kubik | ........................... 91/519 |
| 5,522,212 A | * | 6/1996 | Kubik | ........................... 91/519 |
| 5,542,417 A | * | 8/1996 | Ottestad | ...................... 137/113 |
| 6,691,510 B2 | | 2/2004 | Kariya et al. | |

FOREIGN PATENT DOCUMENTS

| | | |
|---|---|---|
| JP | 34-10389 | 4/1959 |
| JP | 62-502982 A | 11/1987 |
| JP | 63-4401 U | 1/1988 |
| JP | 2001-330005 A | 11/2001 |
| JP | 2002-147404 A | 5/2002 |

\* cited by examiner

*Primary Examiner*—Michael Leslie
(74) *Attorney, Agent, or Firm*—Birch, Stewart, Kolasch & Birch, LLP

(57) ABSTRACT

In a directional control valve device, a first passage connects a second port with a first port by using a part of a movement path of a moving valve element when the moving valve element is in a position of a first end. A second passage connects the second port with the third port by using an internal passage of the moving valve element when the moving valve element is in a second end. The moving valve element is provided with a first check valve for permitting a flow in the internal passage only in the direction from the third port to the second port. When a fluid pressure is applied to the third port, the fluid pressure presses the moving valve element toward the second end so that the first passage is closed, and the first check valve is opened to open the second passage.

4 Claims, 10 Drawing Sheets

81

DIRECTIONAL CONTROL VALVE DEVICE AND FLUID PRESSURE CYLINDER DEVICE

This application is a Continuation of copending PCT International Application No. JP2006/303383 filed on Feb. 24, 2006, which designated the United States, and on which priority is claimed under 35 U.S.C. 120. This application also claims priority under 35 U.S.C. §119(a) on Patent Application No(s). 2005-067139 filed in Japan on Mar. 10, 2005. The entire contents of each of the above documents is hereby incorporated by reference.

TECHNICAL FIELD

The present invention relates to a directional control valve device having three or more ports. It also relates to a fluid pressure cylinder device that can perform both high speed drive and high power drive (high pressure drive) using the directional control valve device. The present invention can be used for a mold clamping device, a press fit device, a caulking machine or a marking press machine, for example.

BACKGROUND ART

Conventionally, a hydraulic cylinder is used for mold clamping in a press machine or the like. For efficient production, the mold clamping is usually performed by moving a die at high speed until the die abuts a work and then pressing the die against the work with high power. A hydraulic cylinder that is used for such a press machine needs a relatively small power for moving the die but needs a high power for pressing the die. Therefore, different hydraulic cylinders may be disposed individually for moving the die and for pressing the die. Alternatively, a ram having a small area for receiving a pressure for moving the die may be embedded in a rod so that the die can be moved at high speed.

In either case, it is necessary to supply hydraulic oil directly from a tank for compensating increase of capacity of cylinder chamber for pressing when moving the die at high speed, while it is necessary to prevent the hydraulic oil for pressing from leaking into the tank when pressing the die. In addition, it is necessary to permit a large quantity of oil in the cylinder chamber for pressing to be discharged into the tank when returning the die from a clamping position to a waiting position.

In order to satisfy these requirements, if different hydraulic cylinders are disposed for moving the die and for pressing the die individually, there is proposed a hydraulic cylinder device 8 utilizing a profile valve 81 that can obtain a large quantity of flow with little pressure drop as shown in FIG. 10, for example (non-patent document 1).

Furthermore, the applicant has proposed and disclosed a fluid pressure cylinder device that can perform both high speed drive and high power drive by one fluid pressure cylinder (patent document 1).

This fluid pressure cylinder device includes a fluid pressure cylinder, a reciprocating pump having two supply and discharge ports for supplying and discharging hydraulic fluid for driving the fluid pressure cylinder in a reciprocating manner and a motor for rotating the reciprocating pump selectively in a forward or a backward direction. The fluid pressure cylinder includes a cylinder tube, a piston that slides inside the cylinder tube, covers for closing both end faces of the cylinder tube and a rod that is connected to the piston and pass through one of the covers. A forward side cylinder chamber of the fluid pressure cylinder is divided into a high speed cylinder chamber having the same effective area for receiving pressure as a backward side cylinder chamber that is a cylinder chamber on a backward side and a high power cylinder chamber having a remaining effective area for receiving pressure. Furthermore, there is provided a valve for switching so that the hydraulic fluid supplied from the reciprocating pump is selectively supplied to the high power cylinder chamber.

[Non-patent document 1] http://www.yuken.co.jp/japanese/pdf/E407.pdf

[Patent document 1] Japanese unexamined patent publication No. 2002-147404

DISCLOSURE OF THE INVENTION

However, in order to carry out the method proposed in the non-patent document 1 using the profile valve 81 by a reciprocating pump, it is necessary to open and close the profile valve when moving the die and when pressing the die even if the reciprocating pump rotates in the same direction. Therefore, it is necessary to prepare an additional pump for generating pilot pressure for activating the profile valve 81.

Furthermore, the fluid pressure cylinder device disclosed in the patent document 1 requires that the effective area for receiving pressure must be equal to each other between the high speed cylinder chamber and the backward side cylinder chamber. It may add a constraint on design of the hydraulic cylinder, and a manufacturing cost may be increased.

An object of the present invention is to provide a directional control valve device and a fluid pressure cylinder device using the same that can flow a large quantity of fluid without an additional hydraulic source even if a reciprocating pump is used, and that does not add any constraint on design of the fluid pressure cylinder.

A device according to an embodiment of the present invention is a directional control valve device with a first port, a second port and a third port, for selecting either a connection between the second port and the first port or a connection between the second port and the third port. The device includes a moving valve element that can move in a reciprocating manner, a first passage for making a connection between the second port and the first port by using a part of a movement path of the moving valve element as a part of the passage when the moving valve element is in a position of a first movable end, a second passage for making a connection between the second port and the third port by using an internal passage of the moving valve element as a part of the passage when the moving valve element is in a second movable end, and a pressing member for pressing the moving valve element toward the first movable end. The moving valve element is provided with a first check valve for permitting a flow in the internal passage only in the direction from the third port to the second port. When a fluid pressure is applied to the third port, the fluid pressure presses the moving valve element to move to the second movable end so that the first passage is closed. After the first passage is closed the first check valve is opened so that the second passage is opened.

Preferably, the device further includes a shut-off valve provided integrally for shutting off hydraulic fluid supplied externally. An inlet side of the shut-off valve forms a fourth port. An outlet side of the shut-off valve connects with the third port.

In addition, the device further includes a second check valve for passing hydraulic fluid inside the second passage to the fourth port.

According to another embodiment, the device includes a tube, a first cover for closing an end of the tube, a second cover for closing the other end of the tube, a moving valve element that can move in a reciprocating manner along the axis inside the tube and the first cover, a first passage for connecting the second port with the first port by using a part of a movement path of the moving valve element as a part of the passage when the moving valve element is in a position of a movable end of the second cover side, a second passage for connecting the second port with the third port by using an internal passage of the moving valve element as a part of the passage when the moving valve element is in a position of a movable end of the first cover side, and a spring member for pressing the moving valve element toward the second cover. The moving valve element includes a poppet valve element for closing the first passage by contacting a valve seat provided to the movable end of the first cover side, and a first check valve provided integrally with the poppet valve element for permitting a flow in the internal passage only in the direction from the third port to the second port. Normally the spring member presses the poppet valve element to keep away from the valve seat so that the first passage is opened. When a fluid pressure is applied to the third port, the fluid pressure presses the moving valve element to move until the poppet valve element contacts the valve seat so that the first passage is closed, and after the first passage is closed the first check valve is opened so that the second passage is opened.

A fluid pressure cylinder device according to an embodiment of the present invention includes the directional control valve device, a reciprocating fluid pressure cylinder including a first cylinder chamber and a second cylinder chamber having an effective area for receiving pressure larger than that of the first cylinder chamber, for reciprocating drive, and a tank for containing hydraulic fluid to be supplied to the fluid pressure cylinder. The fourth port of the directional control valve device is connected to the first cylinder chamber of the fluid pressure cylinder. The second port of the directional control valve device is connected to the second cylinder chamber of the fluid pressure cylinder.

According to the present invention, even if a reciprocating pump is used, a large quantity of flow can be obtained without additional hydraulic source, and design of a fluid pressure cylinder is not restricted.

BEST MODE FOR CARRYING OUT THE INVENTION

Figure 1:
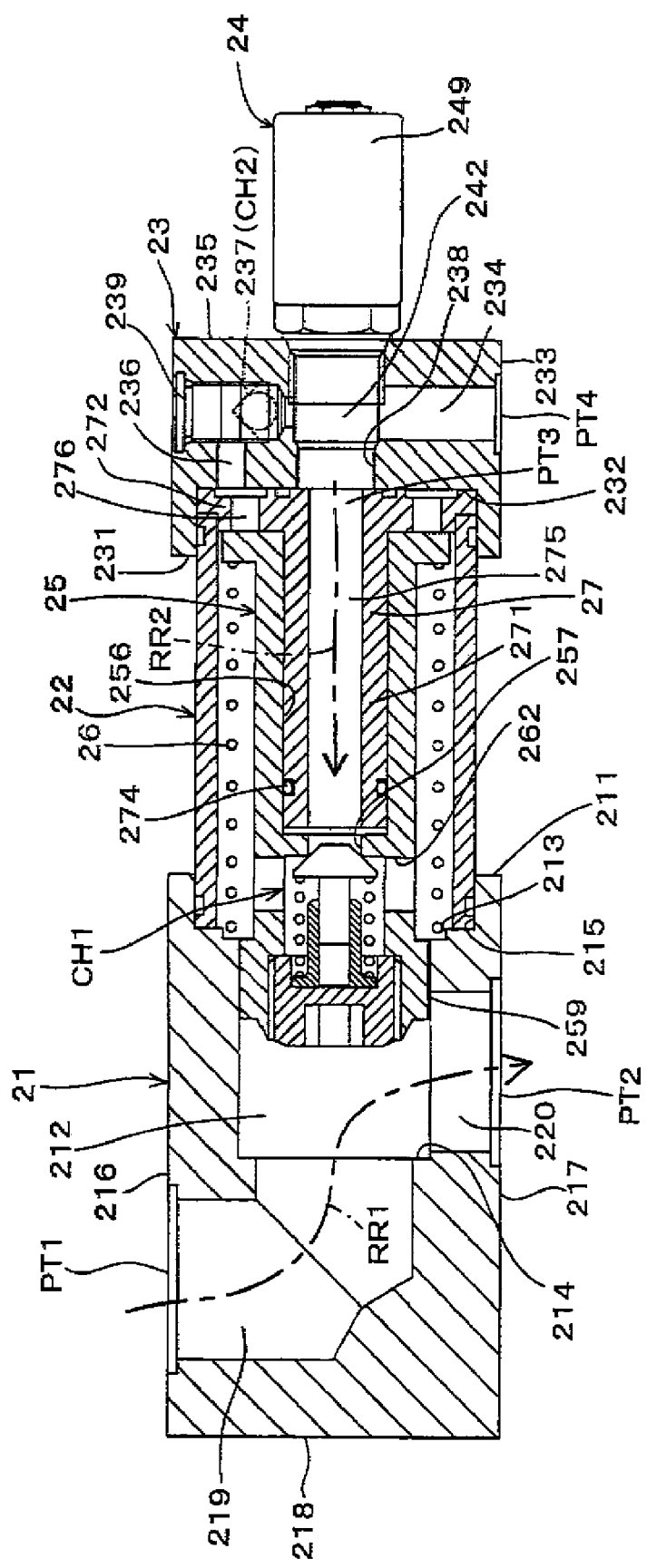
FIG. 1 is a sectional elevation of a directional control valve device in a normal state according to an embodiment of the present invention.
Figure 2:
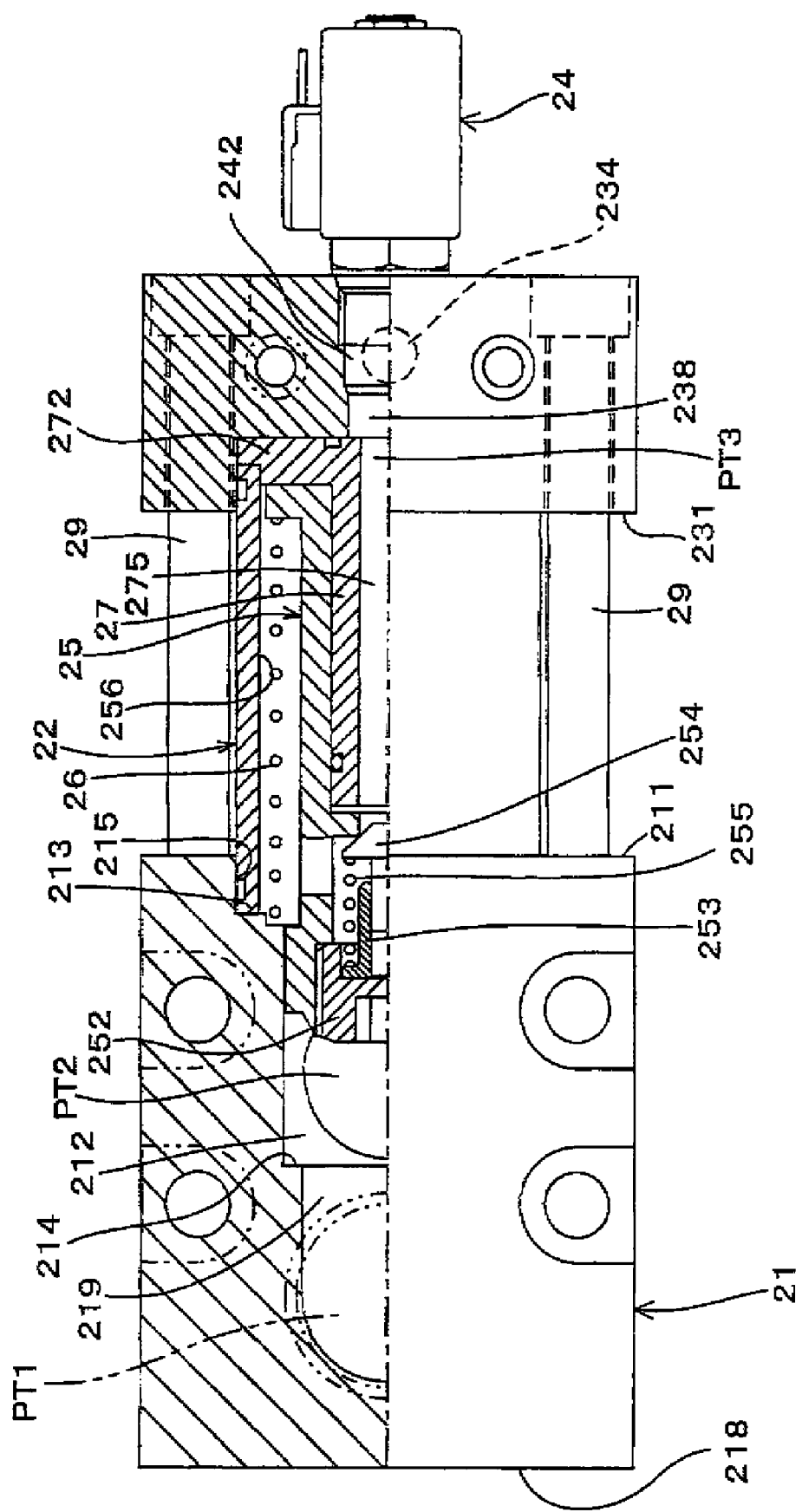
FIG. 2 is a plan view with a partial section of the directional control valve device.
Figure 3:
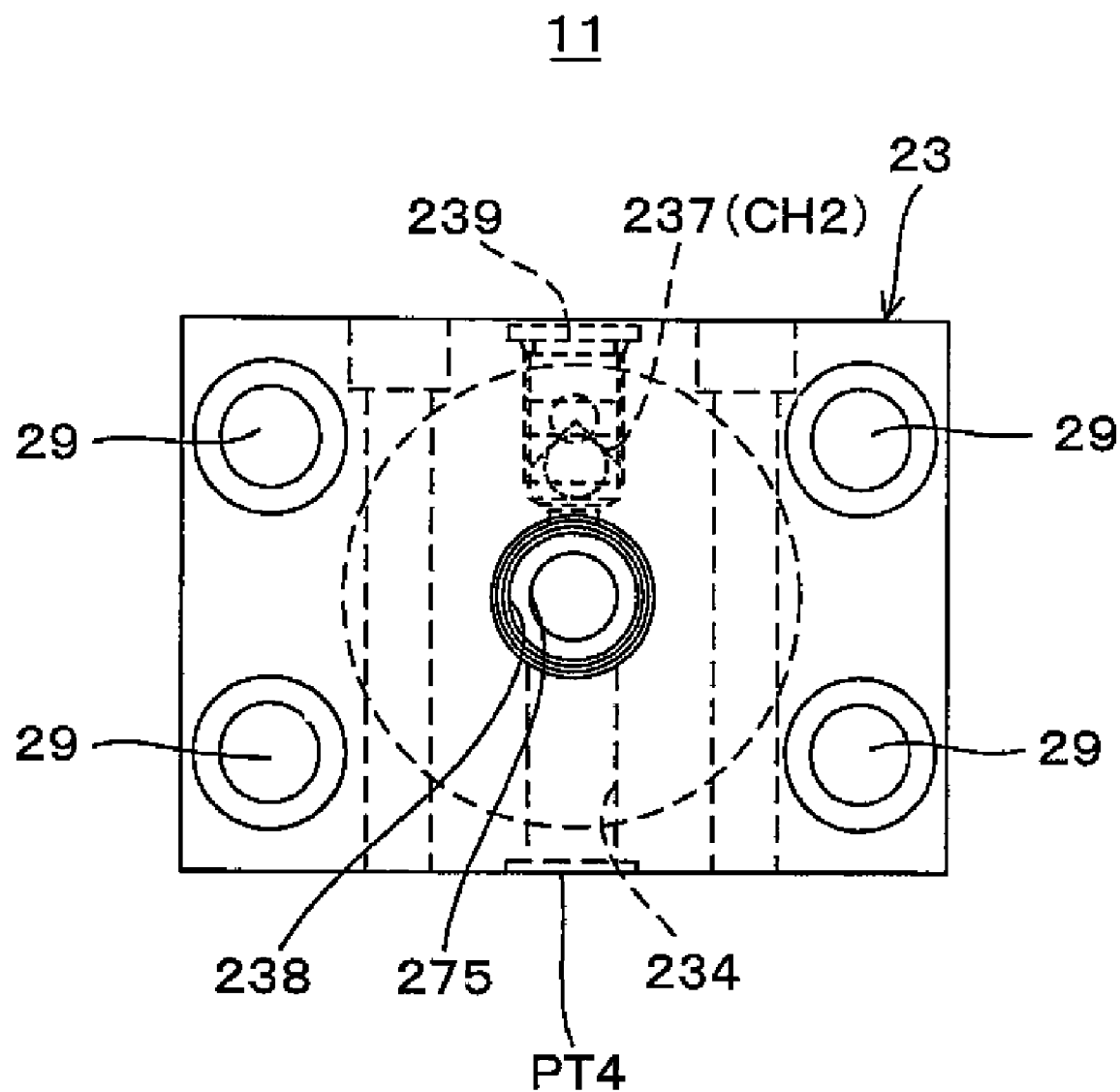
FIG. 3 is a right side view of FIG. 1 in the sate where a solenoid controlled valve is removed.
Figure 4:
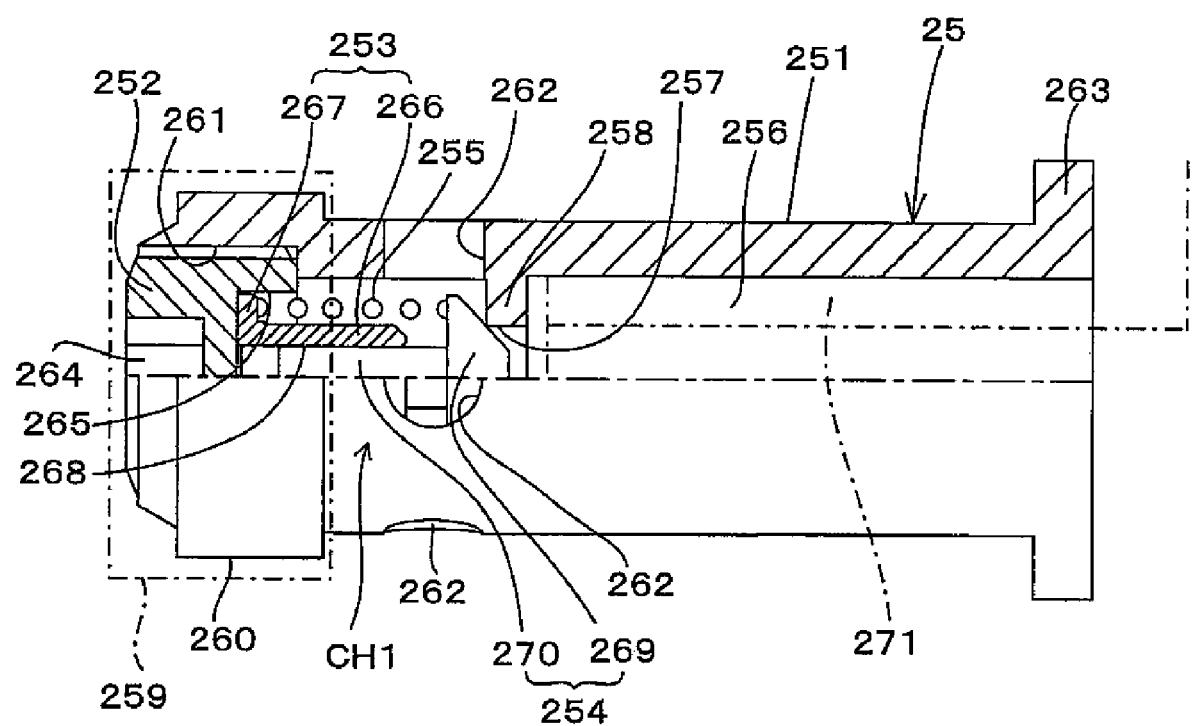
FIG. 4 is a partial cross section of a moving valve element.
Figure 5:
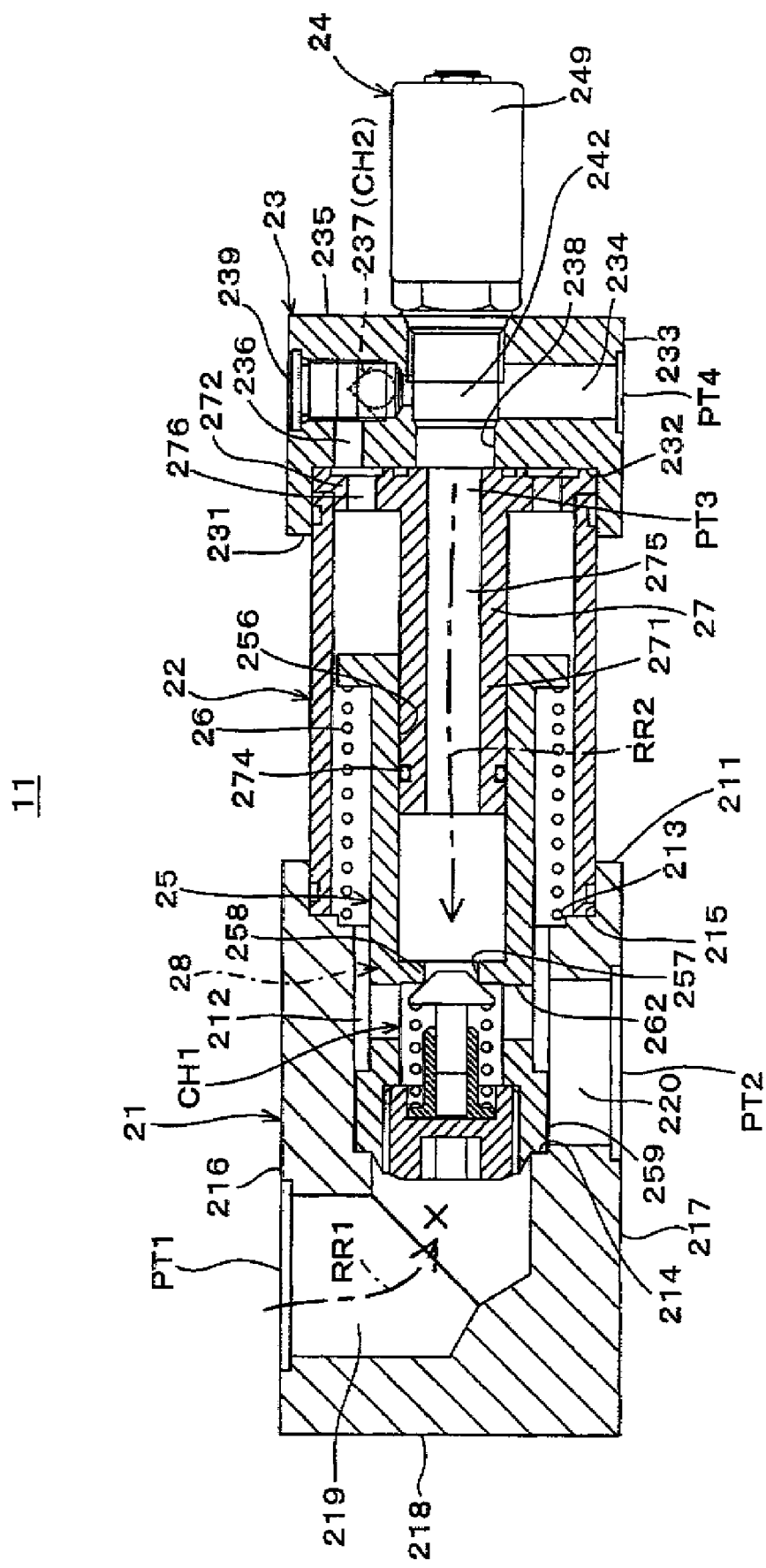
FIG. 5 is a diagram corresponding to FIG. 1, showing a state where the directional control valve device is performing its switching operation.
Figure 6:
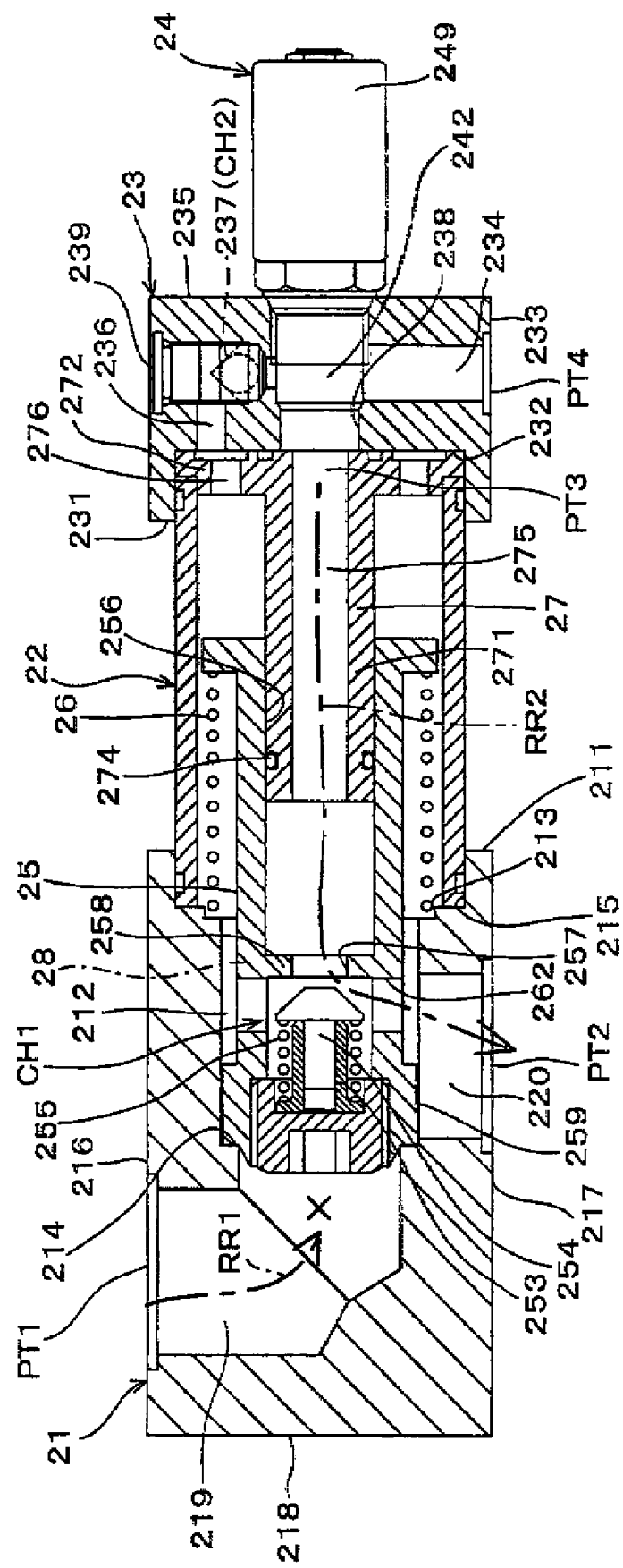
FIG. 6 is a diagram corresponding to FIG. 1, showing a state where the directional control valve device has completed its switching operation.
Figure 7:
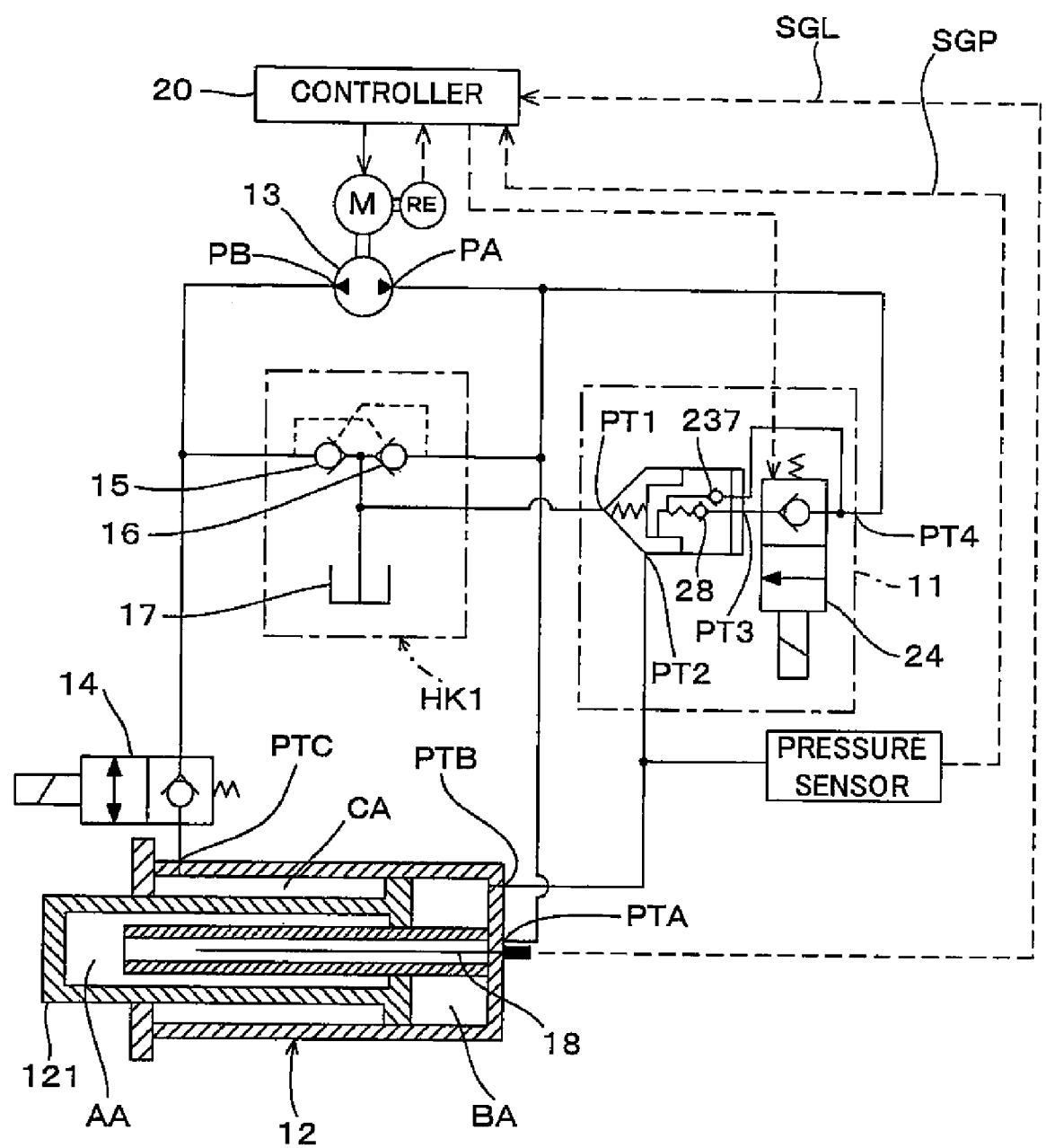
FIG. 7 is a circuit diagram of a hydraulic cylinder device.

FIG. 1 is a sectional elevation of a directional control valve device 11 in a normal state according to an embodiment of the present invention, FIG. 2 is a plan view with a partial section of the directional control valve device 11, FIG. 3 is a right side view of FIG. 1 in the sate where a solenoid controlled valve 24 is removed, FIG. 4 is a partial cross section of a moving valve element 25, FIG. 5 is a diagram corresponding to FIG. 1, showing a state where the directional control valve device 11 is performing its switching operation, FIG. 6 is a diagram corresponding to FIG. 1, showing a state where the directional control valve device 11 has completed its switching operation, and FIG. 7 is a circuit diagram of a hydraulic cylinder device 1.

As shown in FIGS. 1 to 3, the directional control valve device 11 includes a first cover 21, a tube 22, a second cover 23, a solenoid controlled valve 24, a moving valve element 25 and a spring 26.

The first cover 21 is made of a metallic material and has a substantially rectangular solid shape. An end face 211 of the first cover 21 is provided with a hole 212 having a circular section. In the hole 212 a poppet valve element 259 of the moving valve element 25 is inserted in a slidable manner as being described later. Therefore, the hole 212 is a movement path of the poppet valve element 259, and the hole 212 is closed when the poppet valve element 259 contacts a valve seat 214 that is provided to a bottom portion of the hole 212 (see FIGS. 5 and 6).

In the vicinity of a mouth portion of the hole 212, there is provided a spring support portion 213 having a diameter larger than the hole 212. In addition, a large diameter portion 215 having a diameter larger than the spring support portion 213 is provided to the mouth portion of the hole 212. A tube 22 is fitted in the large diameter portion 215.

Furthermore, the first cover 21 is provided with a hole 219 that connects with the hole 212 and has an opening in its upper face, and a hole 220 that connects with the hole 212 and has an opening in its lower face. A mouth portion of the hole 219 is referred to as a first port PT1, and a mouth portion of the hole 220 is referred to as a second port PT2. A passage including the first port PT1, the hole 219, the hole 212, the hole 220 and the second port PT2 is referred to as a first passage RR1.

The second cover 23 is made of a metallic material and has a substantially rectangular solid shape. An end face 231 of the second cover 23 is provided with a hole 232 having a circular section. The tube 22 is fitted in the hole 232. The second cover 23 is provided with a hole 234 that passes through from the upper face to the bottom face, and a hole 238 that crosses the hole 234 and connects with the same so as to pass through from the hole 232 in the end face 231 to the other end face 235.

The solenoid controlled valve 24 is screwed in and attached to the mouth portion of the hole 238 in the end face 235. The solenoid controlled valve 24 is a two position bidirectional valve with a built-in check valve, and the solenoid controlled valve 24 switches between a closed position and an open position as shown in FIG. 7. A valve portion 242 of the solenoid controlled valve 24 opens and closes communication between the hole 234 and the hole 238. More specific operation is as follows. When a solenoid of the solenoid controlled valve 24 is turned off, the passage from the hole 234 to the hole 238 is closed. When the solenoid is turned on, the passage from the hole 234 to the hole 238 is opened.

A mouth portion of the hole 234 in the lower face is referred to as a fourth port PT4. A mouth portion of the hole 234 in the upper face is closed by the plug 239, and there is provided a hole 236 that communicates with the hole 234 and opens to the hole 232. A check valve element 237 that permits a free flow only in the direction from the hole 236 to the hole 234 is provided to the hole 234 at the side closed by the plug 239. The check valve element 237 constitutes a second check valve CH2.

As understood from the above description, hydraulic fluid in the hole 236 can flow out to the fourth port PT4 through the hole 234 regardless of whether the valve portion 242 is opened or closed.

In addition, a moving valve element guide 27 is attached to the second cover 23. The moving valve element guide 27 includes a guide portion 271 having a cylindrical shape and a flange portion 272 having a disk shape. The flange portion 272 is fitted in the hole 232 of the second cover 23. A middle portion of the moving valve element guide 27 is provided with a hole 275 extending along the axis and connecting with the hole 238. A portion of the hole 275 that opens to the hole 238 is referred to as a third port PT3. The flange portion 272 is provided with a hole 276 that connects with the hole 236.

The tube 22 is made of a metallic material and has a circular section. An end face of the tube 22 is fitted in the large diameter portion 215 of the first cover 21 so as to close the same, while the other end face is fitted in the hole 232 of the second cover 23 so as to close the same. The flange portion 272 of the moving valve element guide 27 described above is sandwiched and retained between the other end face of the tube 22 and the second cover 23.

The first cover 21, the tube 22 and the second cover 23 are fastened by four tie bolts 29 with each other so as to be unified as shown in FIGS. 2 and 3. Furthermore, the first cover 21 and the outer surface of the tube 22, as well as the second cover 23 and the outer surface of the tube 22 are sealed with a gasket, respectively.

The moving valve element 25 can move in a reciprocating manner along the axis inside the first cover 21 and the tube 22.

As shown well in FIG. 4, the moving valve element 25 includes a main body 251, a holding plug 252, a valve element guide 253, a check valve element 254 and a spring 255. The poppet valve element 259 is formed on an end portion of the main body 251.

The main body 251 is made of a metallic material and has a substantially cylindrical outer shape. The guide portion 271 of the moving valve element guide 27 is inserted in the inner surface 256 of the main body 251, and the main body 251 can slide in the axial direction with respect to the outer surface of the guide portion 271. Note that an O-ring 274 is attached to the outer surface of the guide portion 271, so that the outer surface of the guide portion 271 and the inner surface 256 are sealed.

A partition 258 is provided to the inner surface 256 of the main body 251 at the middle portion in the axis direction. The partition 258 is provided with a valve hole 257 having a diameter smaller than the diameter of the inner surface 256. A rim of the valve hole 257 is the valve seat.

An end of the main body 251 is provided with a flange portion 263 having a larger diameter, and a spring 26 is disposed in a compressed state between the flange portion 263 and the spring support portion 213. The spring 26 pushes the moving valve element 25 to move to the right end position normally as shown in FIG. 1. The right end position corresponds to a first movable end in the present invention.

The other end of the main body 251 is provided with the poppet valve element 259. The poppet valve element 259 includes a peripheral portion having a diameter larger than other portions of the main body 251, and a land portion 260 is formed in the peripheral portion. The land portion 260 has an outer diameter that is substantially the same as an inner diameter of the hole 212 of the first cover 21, and it can slide on the inner surface of the hole 212. An end portion that is farther from the land portion 260 has a tapered shape, and this tapered portion contacts the valve seat 214 so as to close the hole 212. In this way, when the poppet valve element 259 contacts the valve seat 214 that is provided to the movable end at the side near the first cover 21, the first passage RR1 described above is closed.

A threaded hole 261 is formed on the inner surface of the main body 251 at the portion where the land portion 260 is provided. The holding plug 252 is screwed into the threaded hole 261, so that one of the end faces of the main body 251 is closed.

A hole 265 having a circular section is provided to the holding plug 252 at the inner end face. A valve element guide 253 including a base portion 267 and a valve guide portion 266 is fitted and positioned in the hole 265.

A leg portion 270 of the valve element 254 is inserted in a slidable manner in a circular hole 268 that is provided to the valve element guide 253. A spring 255 is disposed in a compressed state between the base portion 267 of the valve element guide 253 and a head portion 269 of the valve element 254.

The valve element 254 is pushed by the spring 255 so that its head portion 269 contacts the valve seat of the partition 258. Four holes 262, 262 . . . that form a connection between the inside and the outside of the main body 251 are provided to the main body 251 at a pitch of 90 degrees along the circumferential direction in the vicinity of the partition 258.

The valve element 254, the partition 258 and the spring 255 constitute a first check valve CH1.

A passage that is formed inside the moving valve element 25 corresponds to an internal passage in the present invention. More specifically, the hole 275 of the guide portion 271, the valve hole 257, the hole 262 and the like constitute the internal passage. The first check valve CH1 permits a flow only in the direction from the third port PT3 to the second port PT2 in this internal passage. A passage that includes this internal passage and forms a connection between the second port PT2 and the third port PT3 is referred to as a second passage RR2.

In the normal state, i.e., when no fluid pressure is applied to the third port PT3, the directional control valve device 11 is in the state as shown in FIG. 1, where the moving valve element 25 is pushed by the spring 26 to be positioned at the right end, the first passage RR1 is opened, and the second passage RR2 is closed. In the operating state, i.e., when a fluid pressure is applied to the third port PT3, the moving valve element 25 moves to the left side, the poppet valve element 259 contacts the valve seat 214 as shown in FIG. 5, and the first passage RR1 is closed. During this period, the first check valve CH1 keeps its closed state. In other words, restoring forces of the springs 255 and 26 are adjusted so that a pressure that moves the valve element 254 is larger than the pressure that moves the moving valve element 25. More specifically, the valve element 254 moves by a pressure of 0.3 MPa while the moving valve element 25 moves by a pressure of 0.15 MPa, for example.

When the moving valve element 25 reaches the left movable end and stops, a pressure inside the internal passage increases. Then, as shown in FIG. 6, the valve element 254 moves so that the first check valve CH1 opens. Thus, the second passage RR2 is opened.

In order to apply a fluid pressure to the third port PT3, the solenoid of the solenoid controlled valve 24 is turned on while the fourth port PT4 is connected to hydraulic fluid. When the solenoid is turned off, the hydraulic fluid cannot enter the third port PT3. However, since the hydraulic fluid cannot flow out from the second port PT2, a fluid pressure inside the internal passage is not decreased without any other movement. In the state, therefore, the moving valve element 25 does not return even if the solenoid is turned off.

In the directional control valve device 11 according to this embodiment, when a fluid pressure of the fourth port PT4 decreases, the second check valve CH2 opens. Then, the hydraulic fluid in the internal passage flows out through the holes 276 and 236, the second check valve CH2, the hole 234 and the fourth port PT4. Thus, a pressure in the internal passage is decreased, and the moving valve element 25 returns to the right movable end by the spring 26 (the state shown in FIG. 1).

Next, an operation of the directional control valve device 11 will be described together with an operation of the hydraulic cylinder device 1 shown in FIG. 7. First, a circuit of the hydraulic cylinder device 1 will be described.

As shown in FIG. 7, the hydraulic cylinder device 1 includes the directional control valve device 11, a hydraulic cylinder 12, a pump 13, a supplying device HK1, a fall protection valve 14 and a controller 20.

The hydraulic cylinder 12 can perform both high speed drive and high power drive in mold clamping. Therefore, it includes a high speed cylinder chamber AA for driving a rod 121 at high speed, a high power cylinder chamber BA for driving the rod 121 by high power and a backward side cylinder chamber CA for returning the rod 121. In addition, oil is supplied to each of the cylinder chambers AA, BA and CA and is discharged from each of them through the ports PTA, PTB and PTC. Pressure of hydraulic oil (hydraulic fluid) that is supplied to the port PTB is detected by a pressure sensor, and a detection signal SGP thereof is sent to the controller 20.

The pump 13 is a reciprocating pump that can discharge in both directions driven by a motor M forward or backward. Therefore, in accordance with a rotation direction, hydraulic oil is discharged from one of the supply and discharge ports PA and PB, and is supplied from the other. Pressure of the hydraulic oil that is discharged from the pump 13 is approximately 5-20 MPa, for example. The supplying device HK1 including pilot check valves 15 and 16 and a tank 17 is disposed between the supply and discharge ports PA and PB.

The tank 17 contains hydraulic oil for adjusting excess or shortage of the hydraulic oil due to difference of effective area for receiving pressure between the high speed cylinder chamber AA or the high power cylinder chamber BA and the backward side cylinder chamber CA, variation of capacity due to temperature of the circuit and a loss due to leakage.

The fall protection valve 14 prevents the hydraulic cylinder 12 from falling freely to the forward side due to a weight of the die or the like attached to the rod 121 when oil pressure inside the cylinder chamber CA is decreased by stop of the motor M or other reason.

Note that the circuit diagram shown in FIG. 7 represents the case where the rod 121 extends downward. If the rod 121 extends horizontally, the fall protection valve 14 is not necessary. In addition, if the rod 121 extends upward, the fall protection valve may be connected to the ports PTA and PTB.

The controller controls rotation direction, rotation speed and the like of the motor M so that the hydraulic cylinder 12 performs a predetermined operation or predetermined positioning in accordance with detection signals SGL and SGP produced by a measuring sensor 18 and the pressure sensor, set signals and instruction signals (not shown).

The directional control valve device 11 is connected to the tank 17 through the first port PT1, the port PTB of the hydraulic cylinder 12 through the second port PT2, and the supply and discharge port PA of the pump 13 and the port PTA of the hydraulic cylinder 12 through the fourth port PT4.

When the motor M drives the pump 13 so that the hydraulic oil is discharged from the supply and discharge port PA, the hydraulic oil enters the high speed cylinder chamber AA through the port PTA of the hydraulic cylinder 12. Thus, the rod 121 moves at high speed so as to drive the die to move at high speed.

During this period, hydraulic oil is supplied to the fourth passage RR4 of the directional control valve device 11 through the supply and discharge port PA. However, since the solenoid of the solenoid controlled valve 24 is turned off, the hydraulic oil is not supplied to the third port PT3. Therefore, the first passage RR1 keeps its connection state (the state shown in FIG. 1).

When the rod 121 of the hydraulic cylinder 12 moves forward, capacity of the high power cylinder chamber BA is increased. A quantity of the hydraulic oil corresponding to the increase is supplied to the high power cylinder chamber BA from the tank 17 through the first port PT1 of the directional control valve device 11, the first passage RR1, the second port PT2 and the port PTB. In addition, difference quantity between the hydraulic oil discharged from the supply and discharge port PA and the hydraulic oil discharged from the backward side cylinder chamber CA is supplied from the supplying device HK1.

When the rod 121 moves forward so as to move the die to a clamping position, the movement of the rod 121 is stopped. The controller 20 detects this state, and the solenoid of the solenoid controlled valve 24 is turned on.

In order detect that the movement of the rod 121 is stopped, a position detection signal SGL of the rod 121 detected by the measuring sensor 18 is used, for example. Alternatively, it is possible to use various signals including an elapsed signal of a timer, a signal of detecting pressure increasing at the supply and discharge port PA and an external detection signal.

When the solenoid is turned on, the hydraulic oil from the supply and discharge port PA flows into the third port PT3 through the fourth port PT4 and drives the moving valve element 25 to move, so that the first passage RR1 is closed (the state shown in FIG. 5). Then, the first check valve CH1 is opened, so that the second passage RR2 is connected (the state shown in FIG. 6). When the second passage RR2 is connected, the hydraulic oil from the supply and discharge port PA flows into the high power cylinder chamber BA through the fourth port PT4, the third port PT3, the second passage RR2, the second port PT2 and the port PTB. Thus, the hydraulic cylinder 12 performs the high power drive so that the die clamping is performed.

When the clamping is finished, more specifically when a time necessary for the clamping has passed, the controller 20 turns off the solenoid of the solenoid controlled valve 24 and drives the motor M reversely. A supply and discharge port PB of the pump 13 outputs pressured oil, which enters the backward side cylinder chamber CA through a port PTC of the hydraulic cylinder 12. Thus, the rod 121 moves backward at high speed.

On this occasion, the second check valve CH2 of the directional control valve device 11 opens, and the hydraulic oil in the internal passage returns from the fourth port PT4 to the supply and discharge port PA or the tank 17. Thus, the moving valve element 25 returns to its home position, the second passage RR2 is closed, and the first passage RR1 is opened.

Therefore, the hydraulic oil in the high power cylinder chamber BA of the hydraulic cylinder 12 flows back to the tank 17 through the first passage RR1.

In this way, the directional control valve device 11 is used for the hydraulic cylinder device 1 so that the single hydraulic cylinder 12 can perform high speed drive and high power drive without additional hydraulic source other than the pump 13. The entire hydraulic cylinder device 1 can be compact. Furthermore, it is easy to unify the entire of the hydraulic cylinder device 1 so as to realize the integrated compact hydraulic cylinder device 1. It is not required to make the effective areas for receiving pressure equal to each other between the high speed cylinder chamber of the hydraulic cylinder 12 and the backward side cylinder chamber. Therefore, high flexibility in designing the hydraulic cylinder 12 can be ensured. In addition, manufacturing cost can be reduced.

Furthermore, since the first passage RR1 is normally open, the directional control valve device 11 can flow a large quantity of hydraulic oil, so that the rod 121 can be driven at high speed. The circuit configuration of the hydraulic cylinder device 1 can be simplified, and stable operation thereof can be obtained. The configuration of the directional control valve device 11 is also simplified so that the entire device can be compact.

Next, a hydraulic cylinder device 1B according to another embodiment will be explained.

Figure 8:
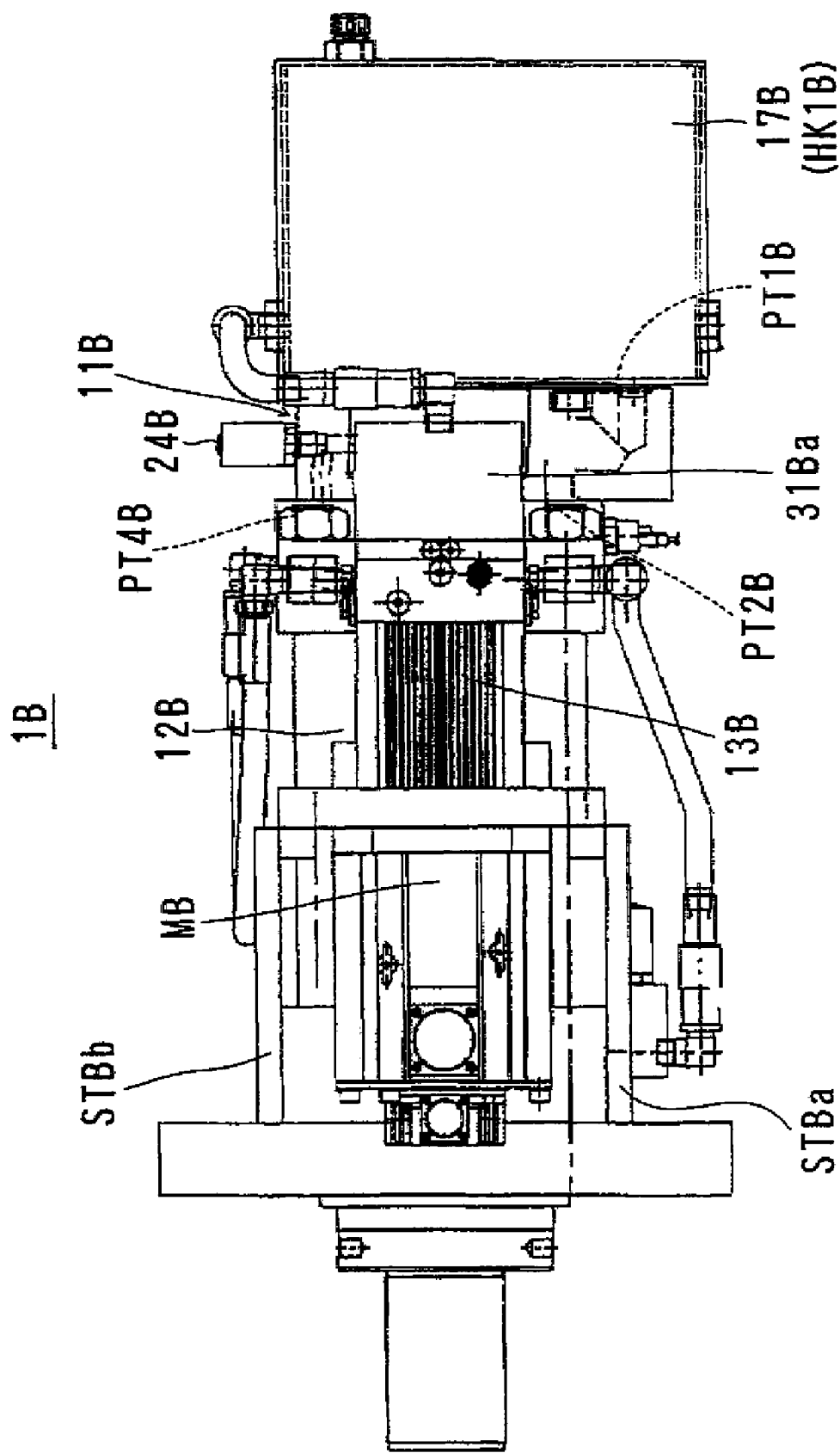
FIG. 8 is an elevation of a hydraulic cylinder device according to another embodiment.
Figure 9:
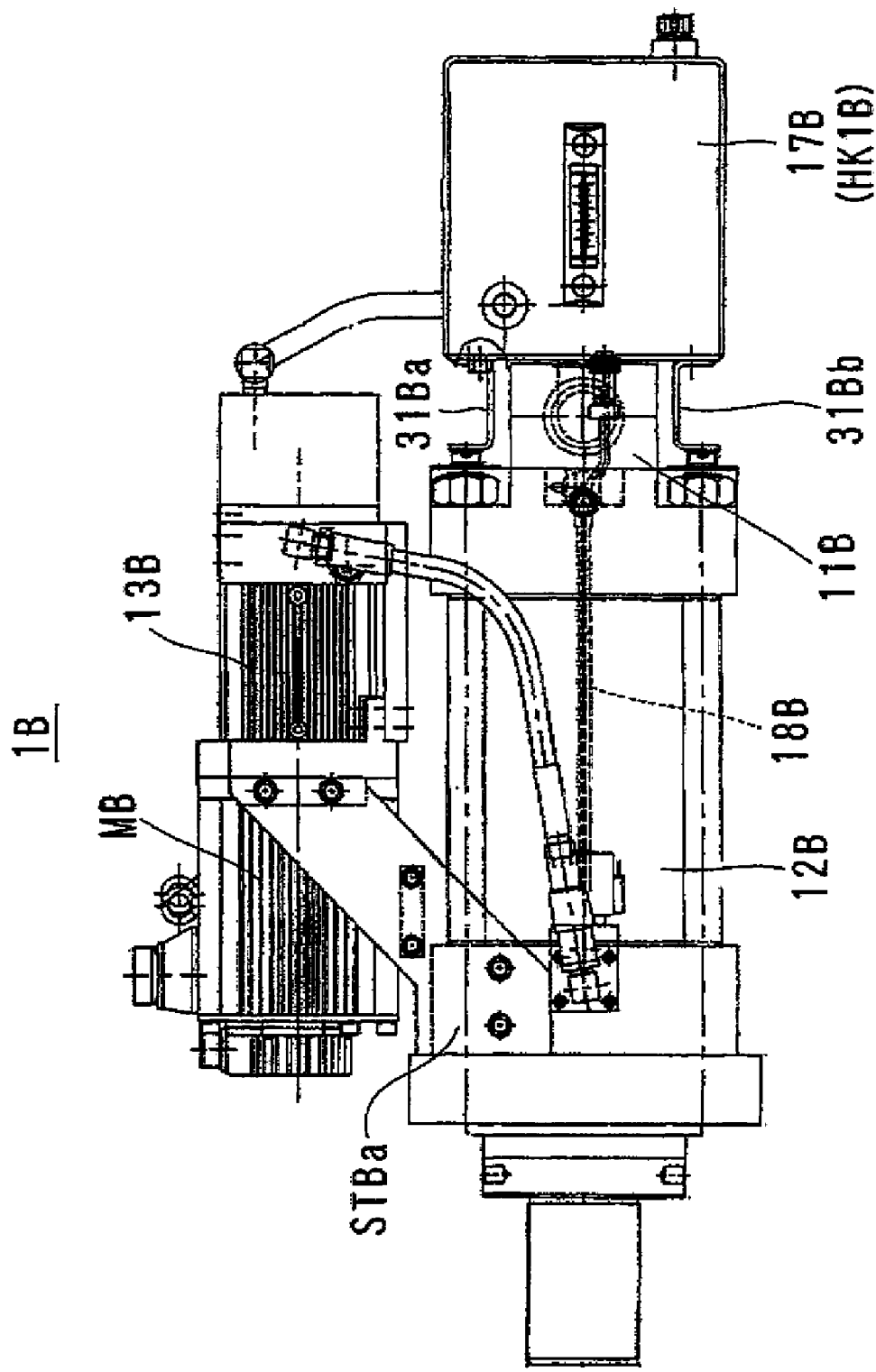
FIG. 9 is a plan view of the hydraulic cylinder device.
Figure 10:
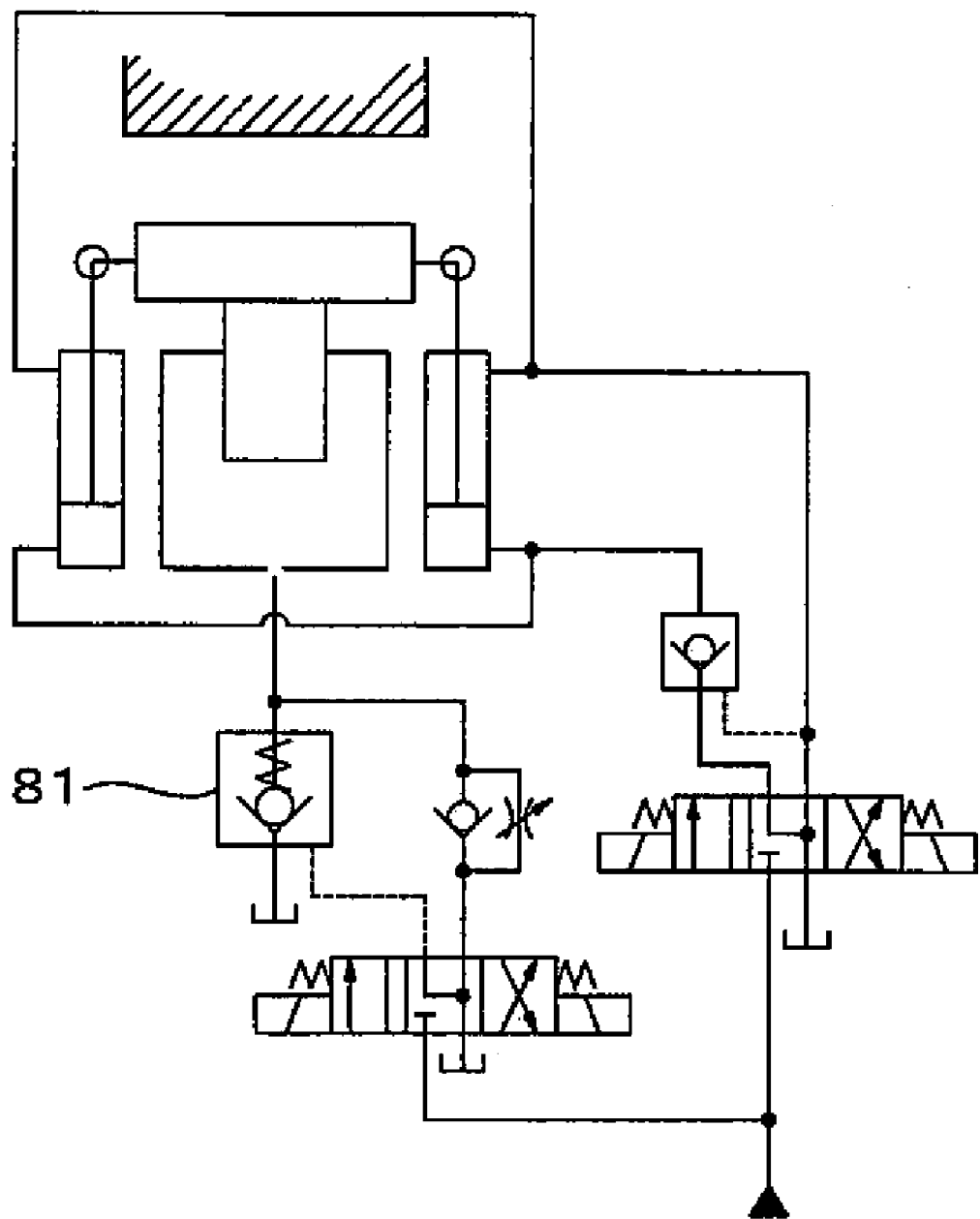
FIG. 10 is a circuit diagram of a conventional cylinder device using a profile valve.

FIG. 8 is an elevation of the hydraulic cylinder device 1B according to another embodiment, and FIG. 9 is a plan view of the hydraulic cylinder device 1B.

The hydraulic cylinder device 1B has an integrated entire configuration of the hydraulic cylinder device 1 described above, and its circuit configuration, function, operation and the like are the same as the hydraulic cylinder device 1. Therefore, only a mechanical arrangement and connection states of elements will be described below.

As shown in FIGS. 8 and 9, the hydraulic cylinder device 1B includes a motor MB, a directional control valve device 11B, a hydraulic cylinder 12B, a pump 13B, a tank 17B and a supplying device HK1B.

The directional control valve device 11B is arranged so that a first port PT1B is positioned at the side of the supplying device HK1B and that a second port PT2B and a third port PT3B are positioned at the side of the hydraulic cylinder 12B. The directional control valve device 11B is sandwiched between the hydraulic cylinder 12B and the tank 17B, and junction members 31Ba and 31Bb make them connect with each other.

The hydraulic cylinder 12B is provided with a measuring sensor 18B at the axis. The pump 13B is structured so that the motor MB is connected to a shaft directly as one unit and is fixed to the hydraulic cylinder 12B using brackets STBa and STBb. A manifold that constitutes the supplying device HK1B is embedded in the tank 17B.

In this way, the entire hydraulic cylinder device 1B has a compact and small-sized configuration, and the unified hydraulic cylinder device 1B can perform high speed drive and high power drive easily to have very good operability.

In the above-described embodiment, the directional control valve device 11 is provided with the solenoid controlled valve 24 integrally. Alternatively, the solenoid controlled valve 24 may be provided independently, and a pipe may be used for connecting them. In this case, the directional control valve device 11 may be configured so that the third port PT3 is exposed from the surface.

Furthermore, the configuration, the structure, the material, the shape, the dimensions, the number or the like of a whole or a part of the first cover 21, the tube 22, the second cover 23, the solenoid controlled valve 24, the moving valve element 25, the spring 26, the directional control valve device 11 and the hydraulic cylinder device 1 or 1B can be modified if necessary in accordance with the spirit of the present invention.

INDUSTRIAL APPLICABILITY

The present invention can be used for a mold clamping device in an injection molding device, a press fit device, a caulking machine, a marking press machine.

The invention claimed is:

1. A directional control valve device with a first port, a second port and a third port, for selecting either a connection between the second port and the first port or a connection between the second port and the third port, the directional control valve device comprising:
   a moving valve element that can move in a reciprocating manner;
   a first passage for making a connection between the second port and the first port by using a part of a movement path of the moving valve element as a part of the passage when the moving valve element is in a position of a first movable end;
   a second passage for making a connection between the second port and the third port by using an internal passage of the moving valve element as a part of the passage when the moving valve element is in a second movable end;
   a spring for pressing the moving valve element toward the first movable end;
   a solenoid valve having an inlet side thereof formed as the fourth port and an outlet side thereof connected to the third port and provided integrally for shutting off hydraulic fluid supplied externally; and
   a second check valve for allowing hydraulic fluid inside the second passage to pass to the fourth port,
   wherein the moving valve element is provided with a first check valve for permitting a flow in the internal passage only in the direction from the third port to the second port, and
   when a fluid pressure is applied to the third port, the fluid pressure presses the moving valve element to move to the second movable end so that the first passage is closed, and after the first passage is closed the first check valve is opened so that the second passage is opened.

2. A fluid pressure cylinder device comprising:
   the directional control valve device according to claim 1;
   a reciprocating fluid pressure cylinder including a first cylinder chamber and a second cylinder chamber having an effective area for receiving pressure larger than that of the first cylinder chamber, for reciprocating drive; and
   a tank for containing hydraulic fluid to be supplied to the fluid pressure cylinder, wherein
   the fourth port of the directional control valve device is connected to the first cylinder chamber of the fluid pressure cylinder, and
   the second port of the directional control valve device is connected to the second cylinder chamber of the fluid pressure cylinder.

3. A directional control valve device with a first port, a second port, a third port, and a fourth port, for selecting either a connection between the second port and the first port or a connection between the second port and the third port, the directional control valve device comprising:
   a tube;
   a first cover for closing an end of the tube;
   a second cover for closing the other end of the tube;
   a moving valve element that can move in a reciprocating manner along the axis inside the tube and the first cover;
   a first passage for making a connection between the second port and the first port by using a part of a movement path of the moving valve element as a part of the passage when the moving valve element is in a position of a movable end of the second cover side;

a second passage for making a connection between the second port and the third port by using an internal passage of the moving valve element as a part of the passage when the moving valve element is in a position of a movable end of the first cover side;

a spring member for pressing the moving valve element toward the second cover;

a solenoid valve having an inlet side thereof formed as the fourth port and an outlet side thereof connected to the third port and provided integrally for shutting off hydraulic fluid supplied externally; and a second check valve for allowing hydraulic fluid inside the second passage to pass to the fourth port, wherein the moving valve element includes a poppet valve element for closing the first passage by contacting a valve seat provided to the movable end of the first cover side, and a first check valve provided integrally with the poppet valve element for permitting a flow in the internal passage only in the direction from the third port to the second port, normally the spring member presses the poppet valve element to keep away from the valve seat so that the first passage is opened, and when a fluid pressure is applied to the third port, the fluid pressure presses the moving valve element to move until the poppet valve element contacts the valve seat so that the first passage is closed, and after the first passage is closed the first check valve is opened so that the second passage is opened.

4. A fluid pressure cylinder device comprising:

the directional control valve device according to claim 3;

a reciprocating fluid pressure cylinder including a first cylinder chamber and a second cylinder chamber having an effective area for receiving pressure larger than that of the first cylinder chamber, for reciprocating drive; and a tank for containing hydraulic fluid to be supplied to the fluid pressure cylinder, wherein the fourth port of the directional control valve device is connected to the first cylinder chamber of the fluid pressure cylinder, and the second port of the directional control valve device is connected to the second cylinder chamber of the fluid pressure cylinder.

* * * * *